June 14, 1960
A. B. BROWN, JR
2,941,089

MAGNETIC CORE COUNTER CIRCUITS

Filed Sept. 10, 1958
2 Sheets-Sheet 1

INVENTOR
A. B. BROWN, JR.
BY William H. Kamstra
ATTORNEY

INVENTOR
A. B. BROWN, JR.
BY William H. Kamstra
ATTORNEY

United States Patent Office 2,941,089
Patented June 14, 1960

2,941,089

MAGNETIC CORE COUNTER CIRCUITS

Alfred B. Brown, Jr., Montclair, N.J., assignor to Bell Telephone Laboratories, Incorporated, New York, N.Y., a corporation of New York Filed Sept. 10, 1958, Ser. No. 760,226
7 Claims. (Cl. 307—88)

This invention relates to electrical counting circuits and more particularly to such circuits employing magnetic cores.

Counting circuits capable of counting successive electrical pulses are well known in the art and numerous examples of such circuits may readily be cited. Such a circuit, for example, is the familiar two-stage "flip-flop" which employs a pair of alternately conducting electron tubes to achieve alternate conditions of equilibrium in which the circuit is left after each of the successive pulses to be counted. Such circuits, although operating satisfactorily, are attended with all of the disadvantages imposed by the use of electron tubes. Thus, from the viewpoint of such factors as power requirements, reliability, physical size, et cetera, electronic counting circuits frequently present problems in applications when these considerations are important. The advent of magnetic cores exhibiting rectangular hysteresis characteristics has made possible counting circuits in which many of these problems are advantageously met and such counting circuits are also known. In the latter magnetic core counting circuit arrangements the pulses which can be counted are frequently critical in that their duration must be limited below a certain maximum pulse length with the result that a particular counting circuit may lack general utility.

An object of this invention is the counting of electrical pulses by means of a new and novel magnetic core circuit.

Another object of this invention is the counting of electrical pulses with minimal regard for maximum pulse length.

A further object of this invention is an improved counting circuit which is simple, inexpensive, and reliable in operation.

The foregoing and other objects are realized according to the principles of this invention in one illustrative circuit comprising a pair of parallel branches each including respectively a winding of a first and a second magnetic core of the well-known square hysteresis loop type. The branch having the first core also includes a capacitor. According to this embodiment if both cores are initially in a reset magnetic state, the first of the pulses to be counted will divide between the two branches nearly equally, both cores will be set, and the capacitor will be slightly charged. The circuit parameters are adjusted so that the second core switches completely before the first core and the capacitor then discharges. After the pulse is terminated, a direct current bias of insufficient magnitude to switch both cores is diverted by capacitor action to switch only the second core to a reset condition. The next pulse to be counted switches only the second core since the first core is still in a set condition. A larger amount of this pulse flows through the branch containing the first core than flowed during the preceding pulse thereby permitting the capacitor to assume a relatively large charge. After the second core switches, the capacitor discharges and the resulting current resets the first core. After the termination of the last pulse, the direct current bias again resets the second core. The second core is thus set by each input pulse and reset by the bias but since the first core is set only by alternate pulses, an output winding on the first core is advantageously utilized to count the input pulses to a base of two. Obviously, no restriction on pulse length is imposed other than that a pulse be long enough to set the second core and that it end in time for the bias to reset the second core. Instead of a direct current bias, a bias pulse of suitable magnitude and duration can be used to reset the second core following each of the pulses that are to be counted.

According to a second embodiment of this invention, a number of scale-of-two counting circuits such as that just described is cascaded to provide counting circuits of other radices.

It is a feature of this invention that a binary counting circuit comprises a pair of magnetic cores and a capacitor, a winding on one of the cores being connected in parallel with the series-connected winding on the other of the cores and the capacitor.

It is another feature of this invention that pulses of a polarity to set the cores be applied to the parallel-connected windings and a bias be applied to the parallel windings at least during the time interval between the application of the setting pulses, the bias being of a polarity to reset the cores.

It is a further feature of this invention that the output be taken from or detected at an output winding of the core whose setting winding is in series with the capacitor, the capacitor serving to prevent the bias from resetting the core and also serving itself to reset the core on application of the next setting pulse to the parallel core windings.

A complete understanding of this invention and of the above and other objects and features thereof may be gained from a consideration of the following detailed description together with the accompanying drawing, in which.

Figure 1:
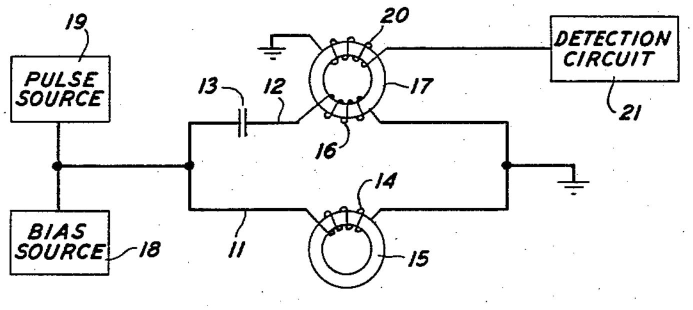
Fig. 1 depicts one specific illustrative counting circuit according to the principles of this invention.
Figure 3:
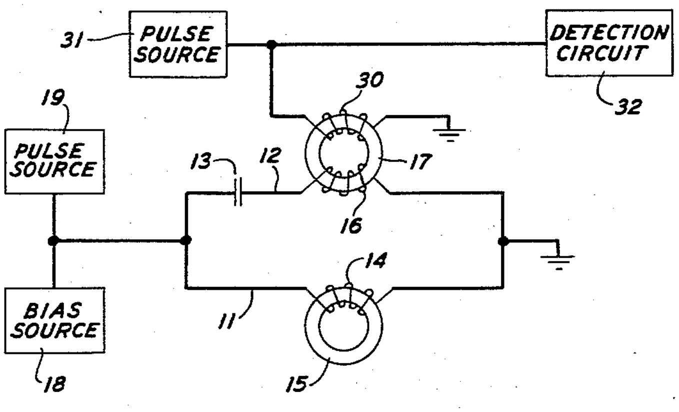
Figure 4:
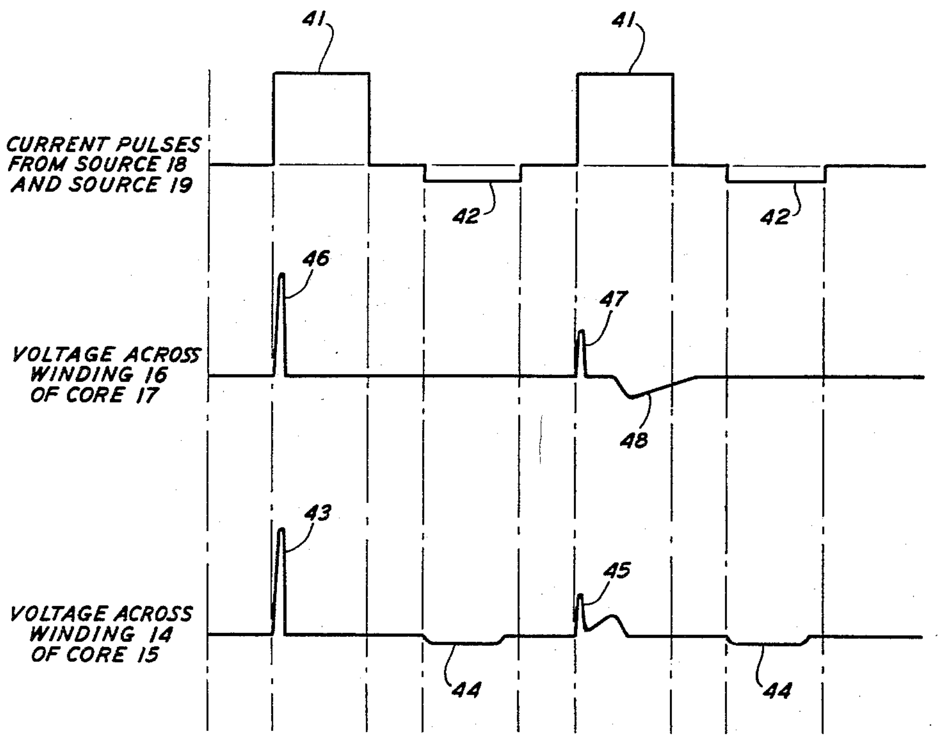

Fig. 3 depicts another illustrative circuit embodying the principles of this invention comprising a circuit for counting the parity of a set of information bits in error-detecting or error-correcting codes; and Fig. 4 is a pulse chart illustrating the relative magnitudes and polarities of bias pulses, pulses to be counted, and output voltages that can be employed in connection with and received from the circuit embodied in Fig. 1.

In Fig. 1 is shown one counting circuit illustrating the principles of this invention which includes a magnetic core 15 and a core 17, each of which may be of the conventional toroidal type displaying substantially rectangular hysteresis characteristics. The circuit also includes a pair of parallel branches 11 and 12 connected between ground and the junction of output connections between a pulse source 19 and bias current source 18. Branch 11 includes a winding 14 inductively coupled to the core 15 and branch 12 includes a capacitor 13 and a winding 16 inductively coupled to the core 17. The core 17 also has an output winding 20 inductively coupled thereto which winding 20 is connected between ground and a detection circuit 21. The current pulse source 19, although represented as a specific source, obviously may be any circuit in which a succession of electrical pulses occurs and which pulses it is desired to count. The bias current source 18 may be any suitable pulse circuit known in the art capable of supplying pulses of an opposite polarity and a smaller amplitude than those of the pulses to be counted. The bias source 18 may also advantageously be any suitable circuit well known in the art capable of providing direct current of a suitable amplitude and of a polarity opposite that of the pulses to be counted. The detection circuit 21 may be any suitable circuit known in the art capable of detecting and utilizing output signals generated by flux reversals in the core 17. Since circuits 18, 19, and 21 will be known to one skilled in the art, they are considered only generally herein and shown in block diagram form only.

Assume cores 15 and 17 to be initially in the reset magnetic condition. A positive current pulse 41, shown in Fig. 4, from source 19 will initially divide nearly equally between branches 11 and 12 and will switch both cores to the set magnetic condition. Core 15 switches completely before core 17 to prevent capacitor 13 from becoming more than slightly charged. Although capacitor 13 initially presents no impedance to the current pulse, it will present an increasing impedance as it begins to charge slowly and will cause a somewhat greater amount of current to be diverted to branch 11 than to branch 12 thereby causing core 15 to switch first. After core 15 has completely switched, the entire current pulse will flow through branch 11 thereby permitting capacitor 13 to discharge. Capacitor 13 was charged only slightly since cores 15 and 17 switched rapidly and, by a suitable selection of circuit parameters, core 17 will be reset only slightly by the discharge and will remain substantially in the set condition. At this point, following the initial pulse 41, both cores will be in the set condition. The pulse chart of Fig. 4 shows the switching voltage pulse 43 appearing across winding 14 of core 15 and the switching voltage pulse 46 appearing across winding 16 of core 17 both caused by the current pulse 41.

After the completion of the first pulse, a negative bias current 42, shown in Fig. 4, from the source 18 resets the core 15. This bias is of insufficient magnitude to switch both cores and the charging of capacitor 13 will prevent all but an initial small amount of bias current from passing through branch 12. As a result, the bias current through branch 12 will reset core 17 only slightly and core 17 will again remain substantially in the set condition. Thus, capacitor 13 will divert the bias current to the branch 11 and the bias current will switch core 15 to the reset condition. After core 15 completely switches, capacitor 13 again discharges and this time sets core 17 very slightly. As a result, upon the completion of the bias current, core 17 will be in a set condition and core 15 in a reset condition. The pulse chart of Fig. 4 shows the long switching voltage pulse 44 which appears across winding 14 of core 15.

The next succeeding positive pulse 41 again sets core 15. Since core 17 is already set, most of the current will initially be diverted into branch 12 and capacitor 13 will charge to a much greater degree than it did during the first pulse 41. Since less current presently flows through branch 11 than during the first pulse, core 15 will switch more slowly than it did during the first pulse. After core 15 has switched, the entire current pulse will again flow through branch 11 and capacitor 13 will discharge. Since now capacitor 13 is charged to a much greater degree than during the first pulse, it will switch core 17 to the reset condition when it discharges. Thus, after the second pulse 41, core 17 will be in the reset condition and core 15 will be in the set condition. The pulse chart of Fig. 4 shows the small voltage pulse 47 across winding 16 of core 17 and the switching voltage pulse 45 across winding 14 of core 15 both caused by pulse 41, and the switching voltage pulse 48 across winding 16 of core 17 caused by the discharge of capacitor 13. Bias current 42 from source 18 will again reset core 15 in the manner previously described and is also shown in the pulse chart of Fig. 4.

Thus, core 15 is set by each pulse and reset by the bias and core 17 is set by alternate pulses and reset by the discharge of capacitor 13. The voltages induced in the output winding 20 of core 17 will be proportional to the voltages across winding 16 of core 17 shown in Fig. 4. Since pulse 46 is of substantially larger magnitude than either pulse 47 or 48, the detection circuit 21 need only distinguish a pulse similar to pulse 46 from other substantially smaller pulses and thereby can count the pulses 41 from source 19 to the base 2.

It can be seen that, except for the avoidance of interference with other operational pulses, there is no limiting maximum length of input pulse to which the circuit will respond. The amplitude of the pulses must be such as to switch both cores rapidly when both are in the reset condition. Each pulse also must be long enough to completely switch core 15. However, there is no limitation on the maximum length of pulse other than that it end in time for the bias to reset core 15.

Figure 2:
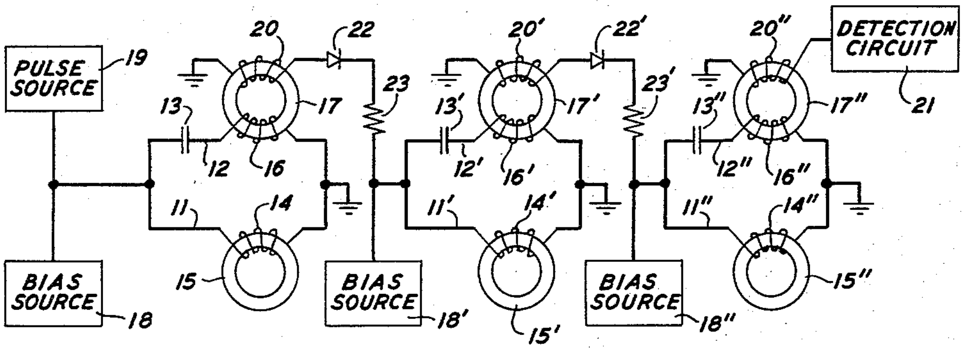
Fig. 2 depicts another illustrative counting circuit comprising the cascaded connection of circuits of the embodiment of Fig. 1.

In Fig. 2 is shown an embodiment of this invention which comprises three circuits of the embodiment of Fig. 1 connected in cascade. The core 17 will again be set by alternate pulses from the source 19 and the output winding 20 is inductively coupled to core 17 in a direction so as to send a positive pulse to the second unit circuit each time core 17 is switched to the set condition. Similarly, alternate ones of these latter pulses will switch core 17′ of the second unit to the set condition and output winding 20′ also of the second unit is inductively coupled to core 17′ in a direction so as to send a positive pulse to the third unit circuit each time core 17′ is so switched. Alternate ones of these latter pulses will switch core 17″ of the third unit to the set condition and will induce a voltage in winding 20″ also of the third unit which voltage will be detected, as previously described, by a detection circuit 21. The detection circuit 21 will thus respond to each eighth pulse from source 19 and the circuit of Fig. 2 employing three of the unit circuits of Fig. 1 comprises, therefore, a scale-of-eight counting circuits.

Diodes 22 and 22′ and resistors 23 and 23′ are employed in connection with the embodiment of Fig. 2. Diodes 22 and 22′, respectively, reduce the loading on cores 17 and 17′ when they are being reset by the discharge of capacitors 13 and 13′, respectively. A bias pulse source is needed for each unit circuit of the embodiment of Fig. 2 and sources 18′ and 18″ are connected respectively to the inputs of the second and third unit circuits. The resistance units 23 and 23′ are employed to prevent the bias pulses from sources 18′ and 18″ from affecting the preceding stages. The unit circuits connected in cascade need not all be of the same size and advantageously the elements of each unit circuit may be of somewhat smaller magnitude than those of the preceding unit circuit.

Obviously, various numbers of unit circuits of Fig. 1 can be connected in cascade to provide counting circuits of varying radices and the connection in cascade of $n$ such unit circuits will provide a circuit which counts to the base $2^n$.

In Fig. 3 is shown an embodiment of this invention which comprises the embodiment of Fig. 1 so modified as to enable the circuit of Fig. 3 to easily determine whether an even or odd number of pulses was received from source 19. This embodiment may advantageously be used in checking the parity of a certain set of information bits in error-detecting or error-correcting codes. The circuit of the embodiment of Fig. 3 includes a pulse source 31, a detection circuit 32, and a winding 30 inductively coupled to core 17. The pulse source 31 may be any suitable pulse source capable of applying positive current pulses of a suitable amplitude and detection circuit 32 may similarly be any circuit capable of distinguishing output signals of varying amplitudes, such as a threshold circuit. Winding 30 inductively coupled to core 17 is wound oppositely from coil 20 in the embodiments of Figs. 1 and 2 in order that a positive pulse from either source 19 or 31 will always tend to drive core 17 to the set position. If cores 15 and 17 are initially both in the reset condition, then at the end of the series of pulses from source 19, determining the condition of core 17 will determine whether an even or odd number of pulses was received from source 19 since an even number would leave core 17 in the reset position while an odd number would place it in the set position.

The condition of core 17 is determined by sending a positive reading pulse from source 31. If core 17 is reset, much of the pulse will be diverted to detection circuit 32. If core 17 is set, most of the pulse will travel through the winding 30 to ground. Thus, the magnitude of the pulse received by detection circuit 32 is indicative of the condition of core 17 and also of whether an even or odd number of pulses was received from source 19. The pulse from source 31 should advantageously be of greater amplitude than the pulse from source 19 in order that the detection circuit 32 can distinguish output signals generated by pulses introduced by source 31 from those introduced by source 19. Alternatively, a pair of diodes could be used to eliminate all spurious signals which otherwise would be received by detection circuit 32.

In one specific embodiment of this invention in accordance with Fig. 1, the magnetic cores 15 and 17 were of the General Dynamic S–3, F–394 type, the windings 14 and 16 each had eight turns, the capacitor 13 was of 0.5 microfarad, the pulses from source 19 were of 0.43 ampere for a duration of about 48 microseconds, and bias pulses from source 18 were of 0.03 ampere for a duration of about 42 microseconds. In another specific embodiment of this invention, the cores 15 and 17 were again of the General Dynamic S–3, F–394 type, the windings 14 and 16 each had 35 turns, the capacitor 13 was again of 0.5 microfarad, the pulses from source 19 were of 0.05 ampere for a duration of 10 microseconds, and the bias from source 18 was a direct current of 0.005 ampere.

What has been described is considered to be only illustrative embodiments according to the principles of the present invention and it is to be understood that numerous other arrangements may be devised by one skilled in the art without departing from the spirit and scope thereof.

What is claimed is:

1. An electrical circuit comprising a first and second magnetic core each having substantially rectangular hysteresis characteristics and each having a first winding inductively coupled thereto, an energizing circuit comprising a pair of branches including respectively said first windings of said first and second cores, means for applying current pulses to said energizing circuit, a first of said pulses setting both of said cores, means for applying biasing current to said energizing circuit for resetting said second core, means included in said branch including said winding of said first core for resetting the said first core subsequent to the termination of a second of said pulses, and an output winding inductively coupled to said first core.

2. A counting circuit comprising a first and second magnetic core each having substantially rectangular hysteresis characteristics and each having a first winding inductively coupled thereto, an energizing circuit comprising a pair of branches including respectively said first windings of the first and second cores, means for applying current pulses to said energizing circuit, one set of alternate ones of said pulses setting both of said cores, means for applying biasing current to said energizing circuit for resetting said second core, means included in said branch including said winding of said first core for resetting the said first core subsequent to the termination of each one of the other set of alternate ones of said pulses, and an output winding inductively coupled to said first core energized responsive to flux changes in said core for generating output signals indicative of alternate pulses.

3. A counting circuit comprising a first and second plurality of magnetic cores each core having substantially rectangular hysteresis characteristics and each having a first winding inductively coupled thereto, a plurality of energizing circuits each comprising a pair of branches including respectively the first winding of one core from each plurality of cores, a capacitor included in each of said branches including a winding of said first plurality of cores, means for applying current pulses to the first of said energizing circuits, means for applying biasing currents to said energizing circuits, each core of the said first plurality having an output winding inductively coupled thereto energized responsive to flux changes in said core, and means connecting said output windings to the energizing circuits of the succeeding cores.

4. An electrical circuit comprising a first and second magnetic core each having substantially rectangular hysteresis characteristics and each having a first winding inductively coupled thereto, an energizing circuit comprising a pair of branches including respectively said first windings of said first and second cores, a capacitor included in said branch including said winding of said first core, means for applying current pulses to said energizing circuit, one set of alternate ones of said pulses setting both of said cores, means for applying biasing current to said energizing circuit for resetting said second core, the other set of alternate ones of said pulses again setting said second core and charging said capacitor, said first core being reset responsive to the subsequent discharge of said capacitor, a second winding inductively coupled to said first core, means for applying read-out current pulses to said second winding, means for diverting part of said read-out pulse from said second winding, the amount of said pulse being diverted being determined by the magnetic condition of said first core, and means for detecting the amount of said read-out pulse diverted from said second winding to determine the magnetic condition of said first core.

5. An electrical circuit comprising a first and a second magnetic core each having substantially rectangular hysteresis characteristics, a winding on each of said cores, a capacitor in series with said winding of said first core, circuit means connecting said winding of said second core in parallel with said capacitor and said first core winding, means applying pulses to said circuit means of a polarity to set said cores, means applying a bias to said circuit means at least intermediate the application of said setting pulses and of a polarity to reset said cores, and means including an output winding on said first core for detecting the state of said first core after application of successive of said setting pulses.

6. An electrical circuit in accordance with claim 5 wherein said means for detecting the state of said first core includes means for detecting the switching of magnetic flux in said first core on the setting of said first core.

7. An electrical circuit in accordance with claim 5 wherein said means for detecting the state of said first core includes threshold circuit means in parallel with said output winding and means for applying pulses to said output winding and said threshold circuit.

References Cited in the file of this patent

UNITED STATES PATENTS 2,876,438 Jones ---------------- Mar. 3, 1959